(12) United States Patent
Garg

(10) Patent No.: US 9,585,118 B2
(45) Date of Patent: Feb. 28, 2017

(54) RADIO OPERATION SWITCH BASED ON GPS MOBILITY DATA

(71) Applicant: Parallel Wireless, Inc., Nashua, NH (US)

(72) Inventor: Sumit Garg, Hudson, NH (US)

(73) Assignee: Parellel Wireless, Inc., Nashua, NH (US)

( * ) Notice: Subject to any disclaimer, the term of this patent is extended or adjusted under 35 U.S.C. 154(b) by 0 days.

(21) Appl. No.: 14/864,194

(22) Filed: Sep. 24, 2015

(65) Prior Publication Data

US 2016/0088585 A1 Mar. 24, 2016

Related U.S. Application Data

(60) Provisional application No. 62/054,442, filed on Sep. 24, 2014.

(51) Int. Cl.

| | |
|---|---|
| *H04W 24/00* | (2009.01) |
| *H04W 64/00* | (2009.01) |
| *H04W 24/02* | (2009.01) |
| *H04W 52/28* | (2009.01) |
| *H04W 88/10* | (2009.01) |
| *H04W 84/00* | (2009.01) |
| *H04W 88/08* | (2009.01) |

(52) U.S. Cl.
CPC ......... *H04W 64/006* (2013.01); *H04W 24/02* (2013.01); *H04W 52/28* (2013.01); *H04W 64/003* (2013.01); *H04W 52/282* (2013.01); *H04W 52/283* (2013.01); *H04W 84/005* (2013.01); *H04W 88/08* (2013.01); *H04W 88/10* (2013.01)

(58) Field of Classification Search
USPC ...................................... 455/456.5
See application file for complete search history.

(56) References Cited

U.S. PATENT DOCUMENTS

| | | | |
|---|---|---|---|
| 6,999,725 | B2 | 2/2006 | Nitta et al. |
| 8,112,115 | B2 | 2/2012 | Natsuno et al. |
| 8,725,185 | B2 | 5/2014 | Ozaki et al. |
| 2008/0070565 | A1 | 3/2008 | Maeda |
| 2013/0084871 | A1 | 4/2013 | Kitaji et al. |
| 2013/0116908 | A1 | 5/2013 | Oh et al. |
| 2014/0233412 | A1 | 8/2014 | Mishra et al. |

*Primary Examiner* — Joel Ajayi
(74) *Attorney, Agent, or Firm* — Michael Y. Saji

(57) ABSTRACT

Systems and methods are disclosed for providing a radio operation switch based on mobility data. In one embodiment, a mobile base station is disclosed, comprising: a global positioning system (GPS) module for determining a current location of the mobile base station; a velocity module coupled to the output of the GPS module for determining a current velocity of the mobile base station; and a controller, the controller configured to perform steps comprising: determining the current velocity of the mobile base station using the velocity module; comparing the current velocity to a threshold; and switching, based on the comparison, from a first radio band to a second radio band.

13 Claims, 3 Drawing Sheets

RADIO OPERATION SWITCH BASED ON GPS MOBILITY DATA

CROSS-REFERENCE TO RELATED APPLICATIONS

This application claims the benefit of priority to U.S. Provisional Patent Application No. 62/054,442, entitled "Radio Operation Switch Based on GPS Mobility Data," filed on Sep. 24, 2014, the entire contents of which are hereby incorporated by reference for all purposes. In addition, this application incorporates the following applications by reference in their entirety: U.S. patent application Ser. No. 13/889,631, entitled "Heterogeneous Mesh Network and a Multi-RAT Node Used Therein," filed on May 8, 2013; U.S. patent application Ser. No. 14/034,915, entitled "Dynamic Multi-Access Wireless Network Virtualization," filed on Sep. 23, 2013; U.S. patent application Ser. No. 14/183,176, entitled "Methods of Incorporating an Ad Hoc Cellular Network into a Fixed Cellular Network," filed Feb. 18, 2014; U.S. patent application Ser. No. 14/024,717, entitled "Heterogeneous Self-Organizing Network for Access and Backhaul," and filed on Sep. 12, 2013; U.S. patent application Ser. No. 14/146,857, entitled "Heterogeneous Self-Organizing Network for Access and Backhaul," and filed on Jan. 3, 2014; and U.S. patent application Ser. No. 14/571,250, entitled "Virtualization of the Evolved Packet Core to Create a Local EPC," filed on Dec. 15, 2014.

BACKGROUND

A base station providing access service tries to provide coverage to a wide area, the area typically being determined by user density. The radio interference generated by the node in a fixed deployment is fairly constant and does not cause neighboring nodes to frequently switch operations such as coverage, transmit power, or cell ID. A mobile node, on the other hand, provides coverage only to devices within the same mobile domain. One of the requirements for a mobile base station is to minimize disruption to the surrounding environment while travelling. This requirement is not met when a mobile base station in a moving vehicle causes mobile nodes to attach and then immediately detach as it transits through an area.

SUMMARY

Systems and methods are disclosed for providing a radio operation switch based on mobility data. In one embodiment, a mobile base station is disclosed, comprising: a global positioning system (GPS) module for determining a current location of the mobile base station; a velocity module coupled to the output of the GPS module for determining a current velocity of the mobile base station; and a controller, the controller configured to perform steps comprising: determining the current velocity of the mobile base station using the velocity module; comparing the current velocity to a threshold; and switching, based on the comparison, from a first radio band to a second radio band.

In another embodiment, a method for providing access to mobile devices at a base station is disclosed, comprising: determining a current location of the base station; determining, based on the current location, a current velocity of the base station; comparing the current velocity to a threshold; and switching, based on the comparison, from a first radio band to a second radio band.

In another embodiment, a method for providing access to mobile devices at a base station is disclosed, comprising: determining a current location of the base station; determining, based on the current location, a current velocity of the base station; comparing the current velocity to a threshold; and reducing transmit power at the base station if the current velocity exceeds the threshold.

DETAILED DESCRIPTION

Figure 1:
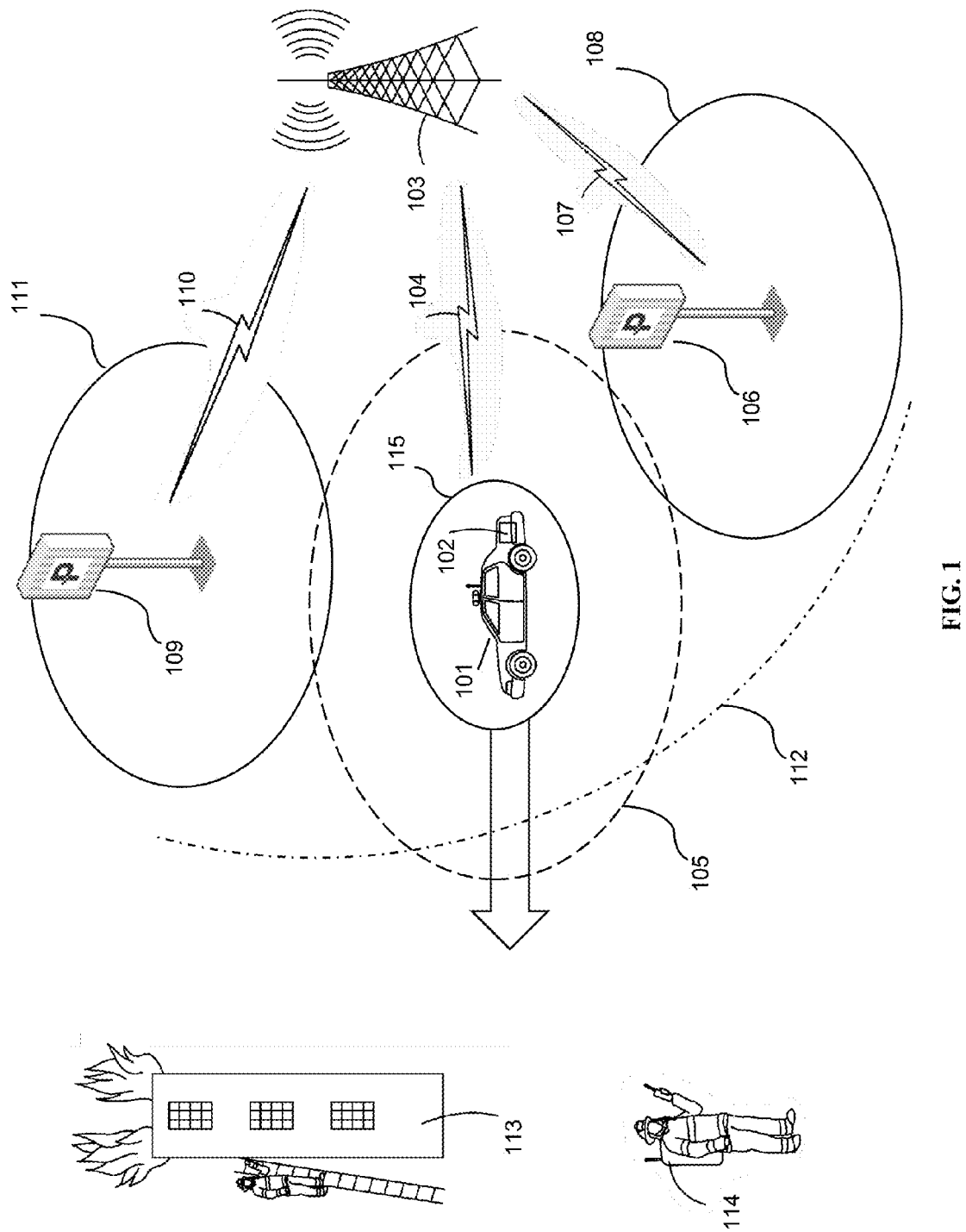
FIG. 1 is a schematic drawing of a mobile base station deployment scenario, in accordance with some embodiments.

A backhaul connection typically handles high speed handovers between fixed-location base stations while not losing the anchor. In 802.11-based WLANs, the 802.11p amendment defines wireless access in vehicular environments and speeds, at frequencies within the 5.9 GHz band, which is 75 MHz wide. This band is not wide enough to allow optimal high throughput operation with channel bonding. In 802.11 (Wi-Fi) channel bonding is used in Super G technology, referred as 108 Mbit/s. It bonds two channels of standard 802.11g, which has a 54 Mbit/s data signaling rate. In IEEE 802.11n, a mode with a channel width of 40 MHz is specified. This is not channel bonding, but a single channel with double the older 20 MHz channel width, thus using two adjacent 20 MHz bands. This allows direct doubling of the PHY data rate from a single 20 MHz channel, but the MAC and user level throughput also depends on other factors so may not double. The 5 GHz band, which is adjacent to the 5.9 GHz band, allows for many channels, but no high velocity operation.

It is noted that the Third Generation Partnership Project (3GPP) Long Term Evolution (LTE) standard is designed for use with vehicular environments. However, the LTE specification was designed with reference to a static macrocell providing service to a mobile user equipment (UE). When a moving UE is accessing a high-powered macrocell at a distance, the effective angular velocity of the UE at the macrocell is reduced owing to the distance the macrocell has from the UE, allowing the macrocell to maintain coverage of the UE. However, a moving small cell suffers from not only comparatively less power, but also increased angular velocity relative to UEs that enter its coverage zone. As well, as the UEs themselves may be in motion, the likelihood that a moving small cell can maintain coverage of UEs that transit through its coverage zone is further reduced. LTE is not designed for inter-vehicular communication.

In embodiments directed toward the access side of a network, a processing module, which may be a self-organizing network (SON) module, is designed to receive location data, such as global positioning system (GPS) data, of a vehicle and to process that data to determine an instantaneous or average velocity, a change in velocity as a function of time (i.e., acceleration), or both. If the SON module detects an increase in velocity, it can transmit a decrease power command to a radio base station or radio node in the moving vehicle. The decrease power command could include for example an amount by which to decrease power.

The decrease power command could also be based on a desired coverage area. The decrease power command could also include a command to decrease power at certain intervals. The decrease in power could also be preconfigured. Decreasing power as velocity is increased serves three purposes: (1) the interference from the cell within which the node of interest is operating will be reduced from the perspective of the macro or other neighboring cells; (2) the number of unwanted handovers is reduced, thereby increasing the quality of service from a UE perspective; and (3) an unwanted/interfering cell is not introduced into an area, which may be useful in the case of a self-organizing network that adjusts coverage based on cells in the area, among other purposes.

In some embodiments, the decreased power level may be configured such that the base station may provide high-speed coverage and access to mobile devices in a moving vehicle which also houses the base station. For example, a mobile base station may be placed inside a vehicle, such as a car, a bus, a plane, or a train. Coverage in the case that the vehicle exceeds 60 miles per hour should be provided to, but limited to, to mobile devices within the vehicle.

In some embodiments, the SON module could determine that velocity is decreasing, in which case it could send a command to the radio node to increase its transmit power. By increasing transmit power, the radio node may: (1) fill coverage voids; (2) provide service to neighboring UEs; and (3) aid in decongesting the network, among other beneficial effects.

In embodiments directed toward the backhaul side of a network, a SON module could be configured to determine if velocity has increased above a certain threshold, such as 60 miles per hour. If the velocity does exceed this threshold, the SON module could send a command to the radio node to switch the wireless local area network (WLAN) radio operation into a different mode for 802.11-based backhaul to 5.9 GHz band WLAN radio operation. Some advantages of making this switch are: (1) the corresponding access cell is also reduced to serve fewer UEs, as per above; (2) by reducing the channel width, the service being provided to UEs should remain constant, as opposed to being degraded; and (3) seamless operation can continue at higher velocities.

In an alternate embodiment also directed toward the backhaul side of a network, a SON module could detect a decrease in velocity below a certain threshold, such as 60 miles per hour. If the velocity falls below the threshold, the SON module could issue a command to a radio node to switch from the 5.9 GHz to the standard 5 GHz Wi-Fi band. Some benefits of performing this switch could be (1) serving more UEs; and (2) using channel bonding to provide a better user experience.

In some embodiments, the mobility data may include GPS or other position, velocity, acceleration, relative position, changes in RSSI or other radio power strength from a known radio transmitter, or other mobility data. Although a threshold of 60 miles per hour is described above, an equivalent threshold for each of the other mobility data parameters could be used in some embodiments.

FIG. 1 is a schematic drawing of a mobile base station deployment scenario, in accordance with some embodiments. Vehicle 101 with mobile base station 102 is shown. Vehicle 101 is connected to macrocell 103 via a wireless backhaul connection 104. Small cells 106 and 109 are connected to macrocell 103 via wireless backhaul connections 107 and 110, respectively. Small cell 106 has coverage area 108. Small cell 109 has coverage area 111. Macrocell 103 has coverage area 112. Vehicle 101 is on its way to disaster site 113, in order to provide radio access to a first responder 114.

Mobile base station 102 has a maximum coverage area 105. However, while the vehicle is in motion, Mobile base station 102 reduces its coverage area to the area shown as 115, by reducing the transmit power of the mobile base station. By reducing the coverage area, mobile base station 102 does not interfere with small cells 106 and 109, or with their wireless backhaul connections 107 and 110, and also does not cause other user devices to connect and then lose connectivity when vehicle 101 exits the proximity of the other user devices. However, the reduced coverage area 115 still permits devices within the vehicle to utilize the wireless backhaul connection 104 to macrocell 103. The wireless backhaul connections may be LTE connections, or they may be 802.11 Wi-Fi connections, or they may be mesh connections, or some combination thereof.

Alternatively, mobile base station 102, which may be using an LTE band or a 5 GHz radio frequency band, may switch modes to another radio frequency band, such as the 5.9 GHz frequency band. The IEEE 802.11p amendment, which uses the 5.9 GHz frequency band, is designed to be used in an inter-vehicular networking environment, and at vehicular speeds. Use of a 5.9 GHz radio access network will therefore not disrupt communications on other frequency bands, such as the LTE or 5 GHz bands, while still permitting communications inside of and between vehicles. Use of the 5.9 GHz band will also not interfere with the use of LTE wireless backhaul connection 104.

Figure 2:
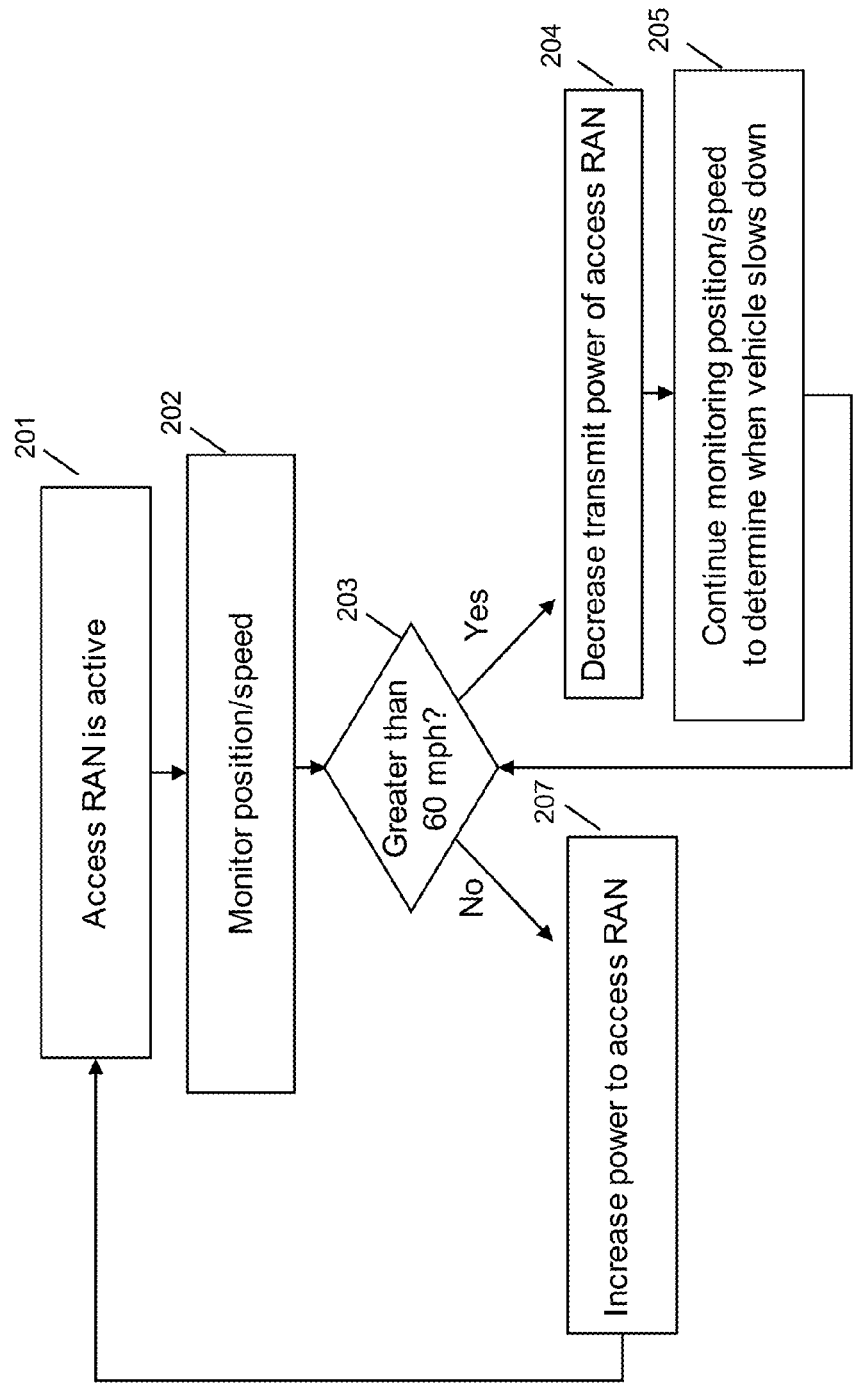
FIG. 2 is a flowchart depicting a method for changing access network power, in accordance with some embodiments.

FIG. 2 is a flowchart depicting a method for changing access network power, in accordance with some embodiments. At step 201, a radio access network (RAN) is in an active state and is transmitting an access signal for mobile devices to attach. For example, a mobile eNodeB may broadcast its availability for UEs to attach. At step 202, the position and/or speed of the mobile base station is monitored. The position may be monitored using a GPS receiver in the mobile base station itself, in some embodiments. Alternatively, the position and/or speed may be monitored by a GPS receiver in the vehicle in which the base station is located, or in a remote control center performing management of the vehicle, or at a server in the cloud monitoring the position of the vehicle, or at another location which may not necessarily be at the vehicle itself.

At step 203, the position and/or speed of the mobile base station is used to determine whether the mobile base station is traveling at greater than a speed threshold, which as shown is 60 miles per hour. Any speed threshold could be used. In some embodiments, the speed threshold is based on the performance specification of the particular access network being provided by the mobile base station. For example, if LTE is the access medium, step 203 could use a threshold approximately equal to the speed of a moving car or train, i.e., between 50 and 150 miles per hour. Alternate access media such as Wi-Fi could use different thresholds.

If, at step 203, the mobile base station is determined to be moving faster than the threshold, execution continues at step 204. At step 204, the transmit power of the access RAN is reduced. Execution continues at step 205, where that position and/or speed of the mobile base station is monitored to determine when the vehicle reaches a slower speed. Monitoring continues until a new determination is performed at step 203.

Alternatively, if, at step 203, the mobile base station is determined to be moving slower than the threshold, execution continues at step 207, and the transmit power of the access RAN is increased, maintained, or restored as appropriate. In some embodiments, execution returns to step 201.

In some embodiments, the mobile base station may be in communication with a cloud coordination server, which may be in communication with other base stations. The cloud coordination server may use measurements from UEs, or from other base stations that it manages, to determine the position or speed of the mobile base station at step 202.

In some embodiments, the steps shown in FIG. 2 may be performed at intervals, such as once per minute or several times per minute. In some embodiments, the steps shown in FIG. 2 may be performed upon a signal received from a vehicle computer, such as an onboard navigation system or a vehicle microprocessor via a vehicular controller area network (CAN) bus. For example, the CAN bus can notify a microcontroller when the engine has been started, causing the steps of FIG. 2 to be performed. Monitoring may also stop when the engine has been stopped, in some embodiments.

In some embodiments, the designated operating band of a suitable radio may be altered, instead of reducing transmit power. For example, a different, private operating band, operated at low power, may be used instead of a common 5 GHz band or LTE band.

The algorithms of the present invention are suited for operation on multi-RAT heterogeneous nodes having self-healing, self-optimization ("SON") software as part of their operating systems. These multi-RAT nodes can be operated in a mesh network and can be stationary or mobile. Details of the multi-RAT nodes and the SON modules are provided in U.S. patent application Ser. Nos. 13/889,631, 14/024,717, and 14/146,857, the contents of which are hereby incorporated by reference in their entirety.

Figure 3:
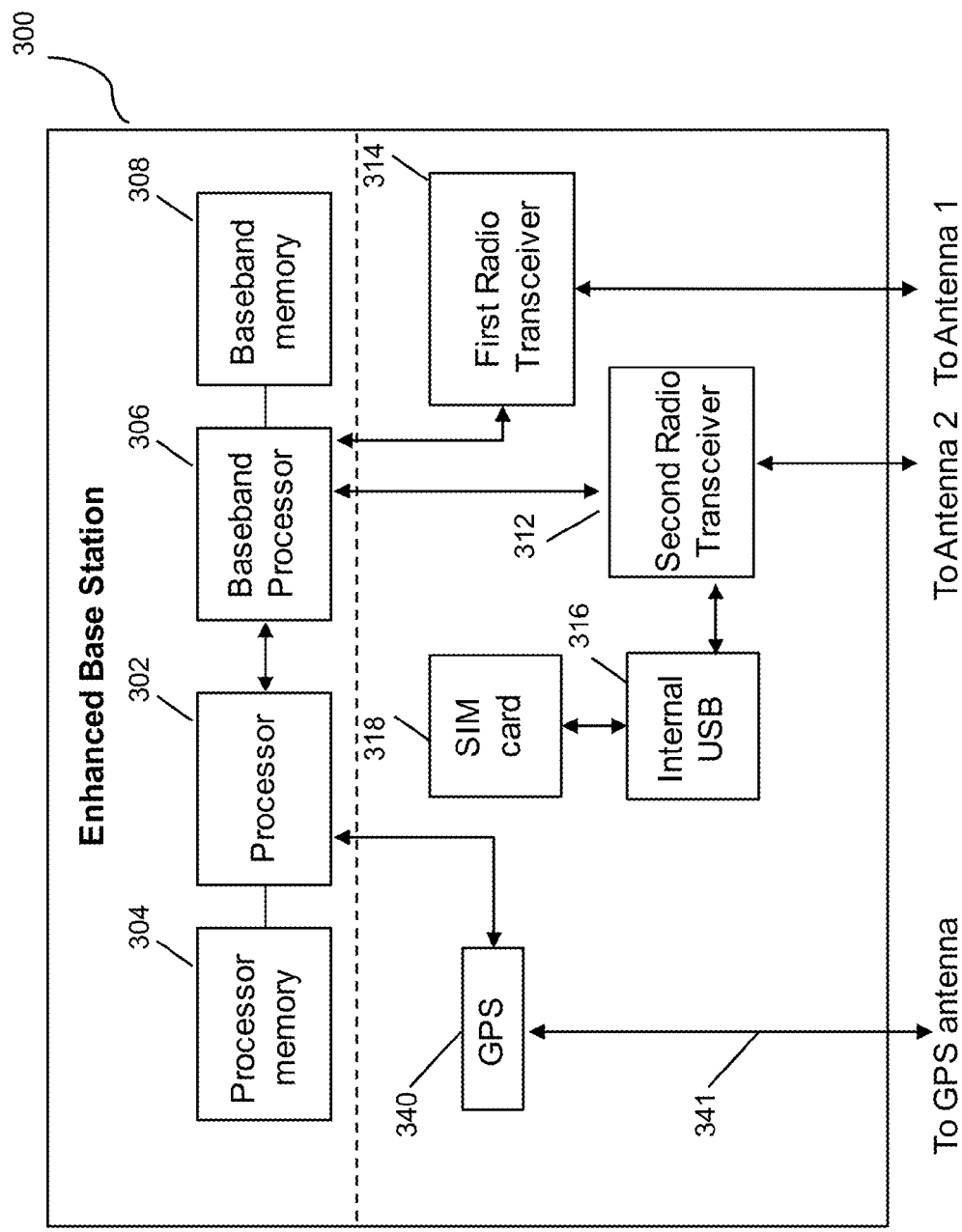
FIG. 3 is a schematic diagram of an enhanced base station, in accordance with some embodiments.

FIG. 3 is a schematic diagram of an enhanced base station, in accordance with some embodiments. Enhanced base station 300 may be an eNodeB for use with LTE, and may include processor 302, processor memory 304 in communication with the processor, baseband processor 306, and baseband processor memory 308 in communication with the baseband processor. Enhanced eNodeB 300 may also include first radio transceiver 310 and second radio transceiver 312, internal universal serial bus (USB) port 316, and subscriber information module card (SIM card) 318 coupled to USB port 314. In some embodiments, the second radio transceiver 312 itself may be coupled to USB port 316, and communications from the baseband processor may be passed through USB port 316.

In some embodiments, processor 302 may be coupled to a global positioning system (GPS) module 340. GPS module 340 may provide information to the processor regarding the location of the mobile base station. GPS module 340 may be connected to a GPS antenna 341 located outside the device, preferably on the top or roof of the exterior of a vehicle in which the base station is mounted, so that the GPS antenna can receive signals from GPS satellites. In some embodiments, the GPS module may provide AGPS functionality, and may cooperate with one or more other wireless modules, such as a Wi-Fi module, to obtain additional information. In environments where the use of the mobile base station is anticipated on a moving vehicle that is underground or out of sight of the sky, another positioning system may be used in conjunction with GPS/AGPS so that the position of the mobile base station may be ascertained at times when GPS is not available. For example, a subway train outfitted with a mobile base station may use other means, such as beacons on the track, to determine position. The position calculated by the GPS module 340 is processed by the processor 302, in some embodiments, to determine velocity. In some embodiments the GPS module can provide the velocity directly.

Processor 302 and baseband processor 306 are in communication with one another. Processor 302 may perform routing functions, and may determine if/when a switch in network configuration is needed. Baseband processor 306 may generate and receive radio signals for both radio transceivers 310 and 312, based on instructions from processor 302. In some embodiments, processors 302 and 306 may be on the same physical logic board. In other embodiments, they may be on separate logic boards.

The first radio transceiver 310 may be a radio transceiver capable of providing LTE eNodeB functionality, and may be capable of higher power and multi-channel OFDMA. The second radio transceiver 312 may be a radio transceiver capable of providing LTE UE functionality. Both transceivers 310 and 312 are capable of receiving and transmitting on one or more LTE bands. In some embodiments, either or both of transceivers 310 and 312 may be capable of providing both LTE eNodeB and LTE UE functionality. Transceiver 310 may be coupled to processor 302 via a Peripheral Component Interconnect-Express (PCI-E) bus, and/or via a daughtercard. As transceiver 312 is for providing LTE UE functionality, in effect emulating a user equipment, it may be connected via the same or different PCI-E bus, or by a USB bus, and may also be coupled to SIM card 318.

SIM card 318 may provide information required for authenticating the simulated UE to the evolved packet core (EPC). When no access to an operator EPC is available, local EPC 320 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 300 is not an ordinary UE but instead is a special UE for providing backhaul to device 300.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 310 and 312, which may be Wi-Fi 302.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 302 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included. The SON module may be configured to provide transmit power increase/decrease functionality, radio band switching functionality, or communications with another remote SON module providing, for example, these types of functionality, in some embodiments. The SON module may be used to perform the steps of FIG. 2 and may execute on the general purpose processor 302.

Processor 302 may identify the appropriate network configuration, and may perform routing of packets from one network interface to another accordingly. Processor 302 may use memory 304, in particular to store a routing table to be used for routing packets. Baseband processor 306 may perform operations to generate the radio frequency signals for transmission or retransmission by both transceivers 310 and 312. Baseband processor 306 may also perform operations to decode signals received by transceivers 310 and 312. Baseband processor 306 may use memory 308 to perform these tasks.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to Wi-Fi networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Accordingly, the disclosure of the present invention is intended to be illustrative of, but not limiting of, the scope of the invention, which is specified in the following claims.

The invention claimed is:

1. A mobile base station, comprising:
a Long Term Evolution (LTE) eNodeB base station;
a global positioning system (GPS) module for determining a current location of the mobile base station;
a velocity module coupled to an output of the GPS module for determining a current velocity of the mobile base station; and
a controller, the controller configured to perform steps comprising:
determining the current velocity of the mobile base station using the velocity module;
comparing the current velocity to a threshold velocity to determine whether the current velocity exceeds the threshold velocity; and
switching, based on the comparison, from a first radio band to a second radio band and from a first power level to a second power level.

2. A method for providing access to mobile devices at a mobile Long Term Evolution (LTE) eNodeB base station, comprising:
determining a current location of the mobile LTE eNodeB base station;
determining, based on the current location, a current velocity of the mobile LTE eNodeB base station;
comparing the current velocity to a threshold velocity to determine whether the current velocity exceeds the threshold velocity; and
switching, based on the comparison, from a first radio band to a second radio band and from a first power level to a second power level.

3. A method for providing access to mobile devices at a mobile Long Term Evolution (LTE) eNodeB base station, comprising:
determining a current location of the mobile LTE eNodeB base station;
determining, based on the current location, a current velocity of the mobile LTE eNodeB base station;
comparing the current velocity to a threshold velocity;
reducing a transmit power at the base station when the current velocity exceeds the threshold velocity;
continuing to monitor the current velocity of the mobile LTE eNodeB base station to determine when to increase the transmit power; and
increasing the transmit power when the current velocity of the mobile LTE eNodeB base station has decreased below a second threshold velocity.

4. The mobile LTE eNodeB base station of claim 1, wherein the first radio band is a 5 GHz Wi-Fi band and the second radio band is a 5.9 GHz 802.11p radio band.

5. The mobile LTE eNodeB base station of claim 1, wherein the first radio band is an LTE access band and the second radio band is a Wi-Fi band.

6. The method of claim 2, further comprising switching, when the comparison shows a decrease in the current velocity, from the first radio band to the second radio band, and wherein the first radio band is a 5.9 GHz 802.11p band and the second radio band is a 5 GHz Wi-Fi band.

7. The method of claim 2, further comprising reducing transmit power at the mobile LTE eNodeB base station based on the comparison.

8. The method of claim 2, further comprising determining the current location of the mobile LTE eNodeB base station based on a global positioning system (GPS) module.

9. The method of claim 2, wherein the first power level is a power level for transmission on the first radio band, the second power level is a power level for transmission on the second radio band, and the first power level is equal to the second power level.

10. The method of claim 2, further comprising continuing to monitor the velocity of the mobile LTE eNodeB base station to determine when to increase transmit power and increasing the transmit power when the current velocity of the mobile LTE eNodeB base station has decreased below a second threshold velocity.

11. The method of claim 3, wherein the threshold velocity is 50 miles per hour, 60 miles per hour, or 150 miles per hour.

12. The method of claim 3, wherein the threshold velocity is equal to the second threshold velocity, such that the transmit power is increased when the current velocity falls below the threshold velocity.

13. The method of claim 3, further comprising increasing transmit power at the mobile LTE eNodeB base station when the current velocity exceeds the threshold velocity.

\* \* \* \* \*